(12) United States Patent
Hayashi

(10) Patent No.: US 7,637,335 B2
(45) Date of Patent: Dec. 29, 2009

(54) MOUNTING STRUCTURE FOR VEHICULAR ELECTRICAL EQUIPMENT

(75) Inventor: Tsuyoshi Hayashi, Nishikamogun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 258 days.

(21) Appl. No.: 10/544,340

(22) PCT Filed: Feb. 11, 2004

(86) PCT No.: PCT/IB2004/000339

§ 371 (c)(1),
(2), (4) Date: Aug. 3, 2005

(87) PCT Pub. No.: WO2004/071798

PCT Pub. Date: Aug. 26, 2004

(65) Prior Publication Data

US 2006/0237248 A1    Oct. 26, 2006

(30) Foreign Application Priority Data

Feb. 13, 2003  (JP) .............................. 2003-035449

(51) Int. Cl.
*B60K 1/04* (2006.01)

(52) U.S. Cl. .................................................. 180/68.5

(58) Field of Classification Search ................ 180/68.1, 180/68.5; 296/37.15
See application file for complete search history.

(56) References Cited

U.S. PATENT DOCUMENTS 5,641,031 A * 6/1997 Riemer et al. .............. 180/65.3

(Continued)

FOREIGN PATENT DOCUMENTS

FR    2 698 591 A    6/1994

(Continued)

OTHER PUBLICATIONS

"Some Headlights Aren't Just For Seeing. They're For Admiring," Automotive Engineering Society of Automotive Engineers, Warrendale, US, vol. 108, No. 12, pp. 53-54, Dec. 2000.

*Primary Examiner*—Frank B Vanaman
(74) *Attorney, Agent, or Firm*—Kenyon & Kenyon LLP

(57) ABSTRACT

A mounting structure is provided for vehicular electrical equipment to be mounted between a floor panel and a seat disposed on the floor panel. The floor panel is provided with a plurality of seat rails for mounting one or more seats such that a position thereof can be adjusted longitudinally. In this mounting structure, the battery pack or the fuel cell assembly is divided into a plurality of battery units or a plurality of fuel cell units. Each of the battery units or the fuel cell units is disposed between a pair of the seat rails.

9 Claims, 7 Drawing Sheets

U.S. PATENT DOCUMENTS

| | | |
|---|---|---|
| 5,704,644 A | 1/1998 | Jaggi |
| 5,844,325 A * | 12/1998 | Waugh et al. .............. 307/10.7 |
| 5,853,058 A * | 12/1998 | Endo et al. ................. 180/65.1 |
| 5,951,084 A * | 9/1999 | Okazaki et al. .......... 296/37.16 |
| 5,957,521 A * | 9/1999 | Schlachter ............... 296/37.15 |
| 6,094,927 A * | 8/2000 | Anazawa et al. .............. 62/239 |
| 6,264,260 B1 * | 7/2001 | Kronner et al. .......... 296/37.15 |
| 6,390,215 B1 | 5/2002 | Kodama et al. |
| 6,563,288 B2 * | 5/2003 | Ueno et al. ................. 318/783 |
| 6,662,891 B2 * | 12/2003 | Misu et al. ................. 180/68.1 |
| 7,048,321 B2 * | 5/2006 | Bandoh et al. ............. 296/37.8 |
| 2004/0016580 A1 | 1/2004 | Kronner et al. |

FOREIGN PATENT DOCUMENTS

| | | |
|---|---|---|
| JP | 06-199183 A | 7/1994 |
| JP | 06-344955 A | 12/1994 |
| JP | 10-109548 A | 4/1998 |
| JP | 2000-233648 A | 8/2000 |
| JP | 2000-238541 A | 9/2000 |
| JP | 2002-095142 | 3/2002 |
| JP | 2003-300419 A | 10/2003 |

* cited by examiner

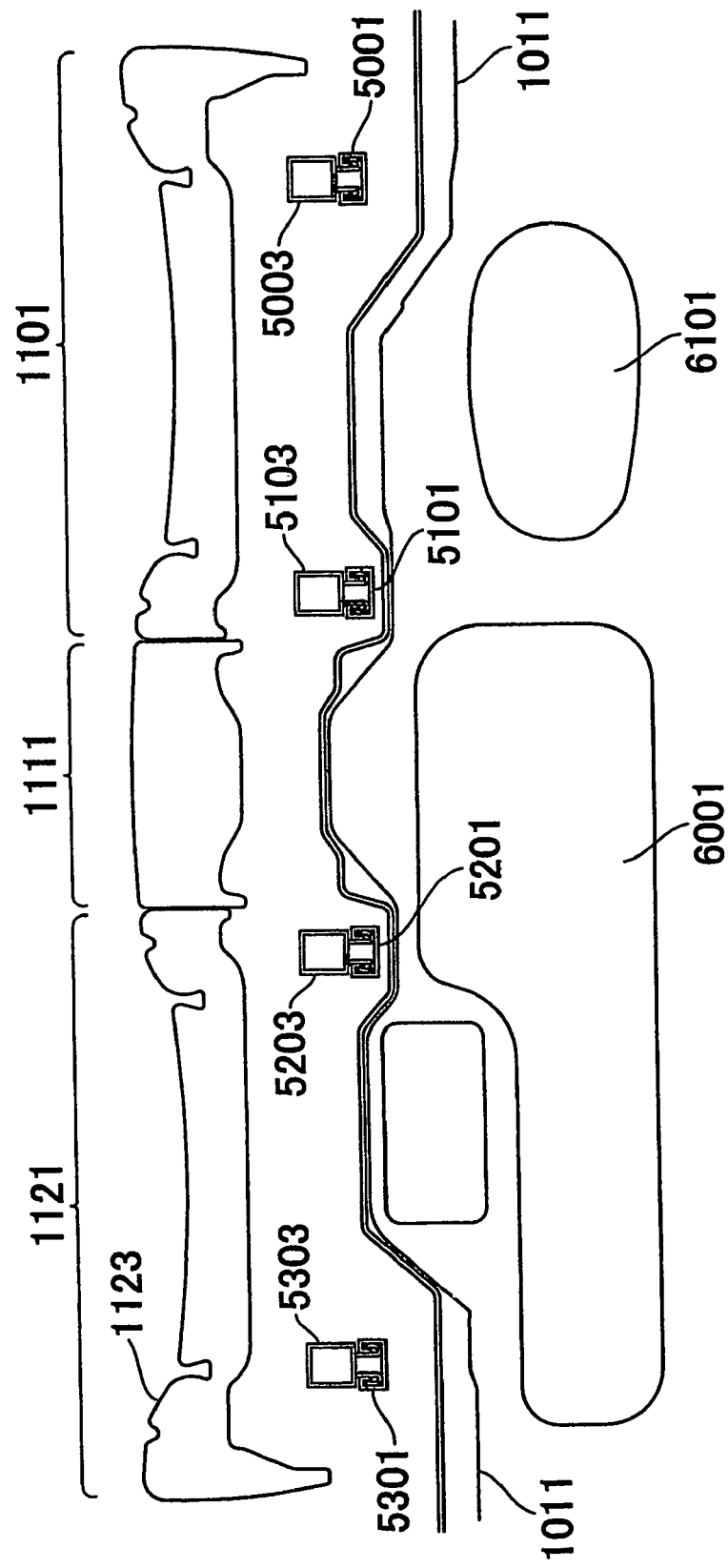

MOUNTING STRUCTURE FOR VEHICULAR ELECTRICAL EQUIPMENT

CROSS REFERENCE TO RELATED APPLICATIONS

This is a 371 national phase application of PCT/IB04/00339 filed 11 Feb. 2004, claiming priority to Japanese Patent Application No. 2003-035449 filed 13 Feb. 2003, the contents of which are incorporated herein by reference.

BACKGROUND OF THE INVENTION

1. Field of Invention

The invention relates to a mounting structure for electrical equipment to be mounted in a vehicle. More particularly, the present application relates to a mounting structure for electrical equipment such as battery packs, fuel cells, etc.

2. Description of Related Art

The development of vehicles having new drive mechanisms such as electric vehicles, hybrid vehicles, etc., has been proceeding in order to improve fuel consumption and for de-polluting exhaust gas. These vehicles must be mounted with electrical equipment (e.g., a fuel cell and a secondary battery for supplying a drive motor with electric power) that is not typically mounted in a vehicle employing an internal combustion engine as the only drive source. From the standpoint of effectively utilizing cabin space, luggage room, and guaranteeing security in case of a collision, proper positioning of the electrical equipment must be determined.

A vehicle disclosed in Japanese Patent Application Laid-Open No. 2000-233648 has a battery mounted on a floor panel in a cabin. In the vehicle disclosed in this publication, the battery (battery pack) is mounted on the floor panel. The battery is disposed in a space that is enclosed by a closed-section member disposed on the floor panel. This battery has a cooling structure wherein an air introduction means for introducing air is coupled to the closed-section member and wherein an air blowout hole is formed in the closed-section member at a predetermined position corresponding to the battery. This battery is divided into two parts to be mounted below the driver and front passenger seats respectively.

According to a structure for mounting the battery mentioned above, the battery is disposed in the space that is enclosed by the closed-section member disposed on the floor panel. The air introduction means for introducing air is coupled to the closed-section member, and the air blowout hole is formed in the closed-section member at the predetermined position corresponding to the battery. Thus, the closed-section member that has long been installed on the floor panel can be effectively utilized as a duct for ventilation and refrigeration. As a result, there is no need to set a new duct or the like. Thus, the battery disposed in the cabin can be ventilated and cooled without adversely affecting the layout quality in the cabin.

However, if the battery is divided into the two parts to be mounted below the driver seat and the front passenger seat respectively as disclosed in the aforementioned publication, functions (a slide function, a fold-down function, and the like) of the seats cannot be realized. If the functions of the seats are to be maintained, spaces for mounting a fuel tank and an exhaust pipe below the floor are narrowed.

This problem to be tackled will be described specifically with reference to FIGS. 6 and 7. FIG. 6 is a lateral view of a rear seat of a vehicle in accordance with the related art. FIG. 7 shows the rear seat of the vehicle in accordance with the related art, which is viewed from a position behind the vehicle.

As shown in FIGS. 6 and 7, a rear-right seat 1101, a rear-center seat 1111, and a rear-left seat 1121 are disposed on seat rails 5001, 5101, 5201, and 5301 via seat fixture jigs 5003, 5103, 5203, and 5303 respectively. The seat rails 5001, 5101, 5201, and 5301 are provided on a floor panel 1011. The rear-right seat 1101 and the rear-left seat 1121 slide independently of each other in a longitudinal direction of the vehicle. The rear-center seat 1111 slides together with the rear-right seat 1101 or the rear-left seat 1121 in the longitudinal direction of the vehicle.

A fuel tank 6001 and a muffler 6101 are disposed below the floor panel 1011. To ensure an increased volume of the fuel tank 6001, an upper face of the floor panel 1011 has convex portions in regions where the seat rails 5001, 5101, 5201, and 5301 are not disposed. The height from the ground to a surface 1123 of the seats cannot be increased so as to enable passengers to smoothly get in or out of the vehicle with proper head clearance. In principle, both the front and rear seats are equally restricted by the structural conditions discussed herein.

Thus, mounting batteries below the front and rear seats may be contemplated. In this case, the slide function of the seats needs to be abandoned to ensure spaces below the seats using the spaces for installation of the seat rails, or the fold-down function of the seats needs to be abandoned to ensure spaces below the seats. Reducing the height of the batteries may be contemplated so that they can be mounted while maintaining the functions of the seats.

However, if the slide and fold-down functions of the seats are abandoned, the arrangement of the seats is needlessly limited, or effective utilization of the cabin space and the luggage room space is hindered. Even if the height of the batteries is reduced, they must remain unchanged in volume so as to remain unchanged in capacity. Therefore, the lateral dimensions of the batteries is increased, so that the batteries protrude beyond a width of the vehicle.

In particular, there is a demand to mount batteries following strict service conditions, such as with respect to temperature (e.g., lithium-ion batteries or nickel-hydrogen batteries) not in an engine compartment, but in a cabin.

SUMMARY OF THE INVENTION

The invention provides a mounting structure for vehicular electrical equipment wherein the electrical equipment is to be mounted between a floor panel and a seat while various functions of the seat are realized.

As one aspect of the invention, a mounting structure is provided for vehicular electrical equipment wherein a battery pack is mounted between a floor panel and a seat disposed on the floor panel. In this mounting structure, a plurality of seat rails are provided for mounting one or more seats such that a position of each seat can be adjusted in a longitudinal direction of a vehicle. The electrical equipment is mounted between one or more pairs of the seat rails.

According to this mounting structure, a slide function of longitudinally adjusting the position of the seat can be realized. As a result, a structure for mounting electrical equipment between the floor panel and the seat can be provided while various functions of the seat are realized.

As another aspect of the invention, a mounting structure for vehicular electrical equipment such as a battery pack is provided. In this mounting structure, a plurality of seat rails for mounting one or more seats are provided on the floor panel such that a position of the seats can be adjusted in a longitudinal direction of a vehicle. The battery pack is mounted between one or more pairs of the seat rails.

According to this mounting structure, the battery pack can be mounted between the floor panel and the seat while various functions of the seat are realized. Because a space between the floor panel and the seat corresponds to a dead space of the related art, a cabin space and a luggage room space of an electric vehicle or a hybrid vehicle can be utilized effectively.

In the aforementioned mounting structure, it is preferable that the battery pack includes a plurality of cells or modules according to a performance of the vehicle, and is constructed by being divided into a plurality of battery units each of which includes one or more of the cells or the modules and is mounted such that each of the battery units is disposed between corresponding ones of the seat rails.

According to this mounting structure, a slide function of longitudinally adjusting the position of the seat can be realized. As a result, even in the case where the number of the cells or modules constituting the battery pack to be mounted is large, a structure for mounting batteries between the floor panel and the seat can be provided while various functions of the seat are realized.

As another aspect of the invention, a mounting structure for vehicular electrical equipment such as a fuel cell is provided. In this mounting structure, a plurality of seat rails for mounting one or more seats are provided on the floor panel such that a position of the seats can be adjusted in a longitudinal direction of a vehicle. The fuel cell assembly is mounted between a pair of the seat rails.

According to this mounting structure, the fuel cell assembly can be mounted between the floor panel and the seat while various functions of the seat are realized. Because a space between the floor panel and the seat corresponds to the dead space of the related art, a cabin space and a luggage room space of a fuel-cell vehicle can be effectively utilized.

In the aforementioned mounting structure, it is preferable that the fuel cell assembly includes a plurality of cells or modules according to a performance of the vehicle, and is constructed by being divided into a plurality of fuel cell units each of which includes one or more of the cells or the modules and is mounted such that each of the fuel cell units is disposed between one or more pairs of seat rails.

According to this mounting structure, the slide function of longitudinally adjusting the position of the seat can be realized. As a result, even in the case where the number of the cells or modules constituting the fuel cell assembly to be mounted is large, a structure for mounting the fuel cell assembly between the floor panel and the seat can be provided while various functions of the seat are realized.

In the aforementioned mounting structure, it is preferable that a control apparatus for controlling the battery pack (the fuel cell assembly) be disposed between corresponding ones of the battery units (the fuel cell units). The control apparatus for controlling the battery units (the fuel cell units), for example, a battery computer (a fuel cell computer), a current sensor, a system main relay or the like is smaller in height than the batteries (the fuel cell). Therefore, the control apparatus can be disposed between corresponding ones of the battery units (the fuel cell units), namely, between the seat rails and the floor panel. As a result, the cabin space and the luggage room space of the electric vehicle or the hybrid vehicle can be utilized more effectively.

In this case, it is preferable that the control apparatus be disposed between the seat rails and the floor panel. In this construction, the control apparatus is disposed between the seat rails and the floor panel, and thus does not interfere with the seat rails. As a result, the slide function of the seat can be realized.

In the aforementioned mounting structure, the seat may be a rear seat. The rear seat is often not designed as a split-type separate seat. Therefore, there is an ampler space available below the rear seat than below a front seat. Thus, an electrical equipment of a larger size can be mounted below the rear seat.

In this case, it is preferable that the rear seat be a second-row seat. In a vehicle having first-row, second-row, and third-row seats, the second-row seat (the front one of two rear seats, namely, the front one of the second-row and third-row seats) is often not designed as a split-type separate seat. Therefore, there is an ampler space available below the second-row seat than below the front seat. Thus, an electrical equipment of a larger size can be mounted below the second-row seat.

In the aforementioned mounting structure, the seat may be a front seat. The front seat may not be designed as a split-type separate seat. In this case, the space below the front seat may be equal in ampleness to the space below the rear seat. Thus, an electrical equipment of a large size can be mounted below the front seat.

In the aforementioned mounting structure, the seat may have a vertically adjustable seating face. In this construction, even in the case where the seat has a fold-down function, namely, where the seating face thereof can be vertically adjusted, the cabin space and the luggage room space can be utilized effectively while the function of the seat is realized by making use of a dead space below the seat.

In this case, it is preferable that the seat be a seat having a fold-down function. In this construction, even in the case where the seat is a rear seat having a fold-down mechanism, the cabin space and the luggage room space of the vehicle can be utilized effectively.

BRIEF DESCRIPTION OF THE DRAWINGS

The above-mentioned objects, features, advantages, technical and industrial significance of this invention will be better understood by reading the following detailed description of an exemplary embodiment of the invention, when considered in connection with the accompanying drawings, in which:

FIG. 7 is a rear view of the vehicle that is mounted with the battery pack using the mounting structure in accordance with the related art of the invention.

DETAILED DESCRIPTION OF EXEMPLARY EMBODIMENT

In the following description, the invention will be described in more detail in terms of an exemplary embodiment thereof.

A vehicle 1000 that is mounted with a battery pack using a mounting structure for a vehicular electrical equipment in accordance with the embodiment of the invention will be described with reference to FIGS. 1 and 2.

Although the battery pack is cited as an example of the electrical equipment mounted in the vehicle 1000 in the following description, the invention is not limited to the example. Even if the electrical equipment is a fuel cell or the like instead of a battery pack, the mounting structure in accordance with the invention is applicable.

In the following description, batteries constituting the battery pack may be any of lead-acid batteries, lithium-ion batteries, and nickel-hydrogen batteries. The batteries constituting the battery pack may be different from any of the above-mentioned batteries.

It is assumed in the following description that the battery pack is mounted below a rear seat. For example, however, if a front seat is of a so-called bench seat type, the battery pack may also be mounted below the front seat.

A battery pack is composed of a plurality of modules, each of which is composed of a plurality of cells. One battery pack is divided into a plurality of units, each of which is composed of one or more modules. For instance, if one battery pack is composed of 30 modules each of which is composed of six cells, the battery pack is constituted by being divided into a first unit composed of 12 modules, a second unit composed of six modules, and a third unit composed of 12 modules.

Figure 1:
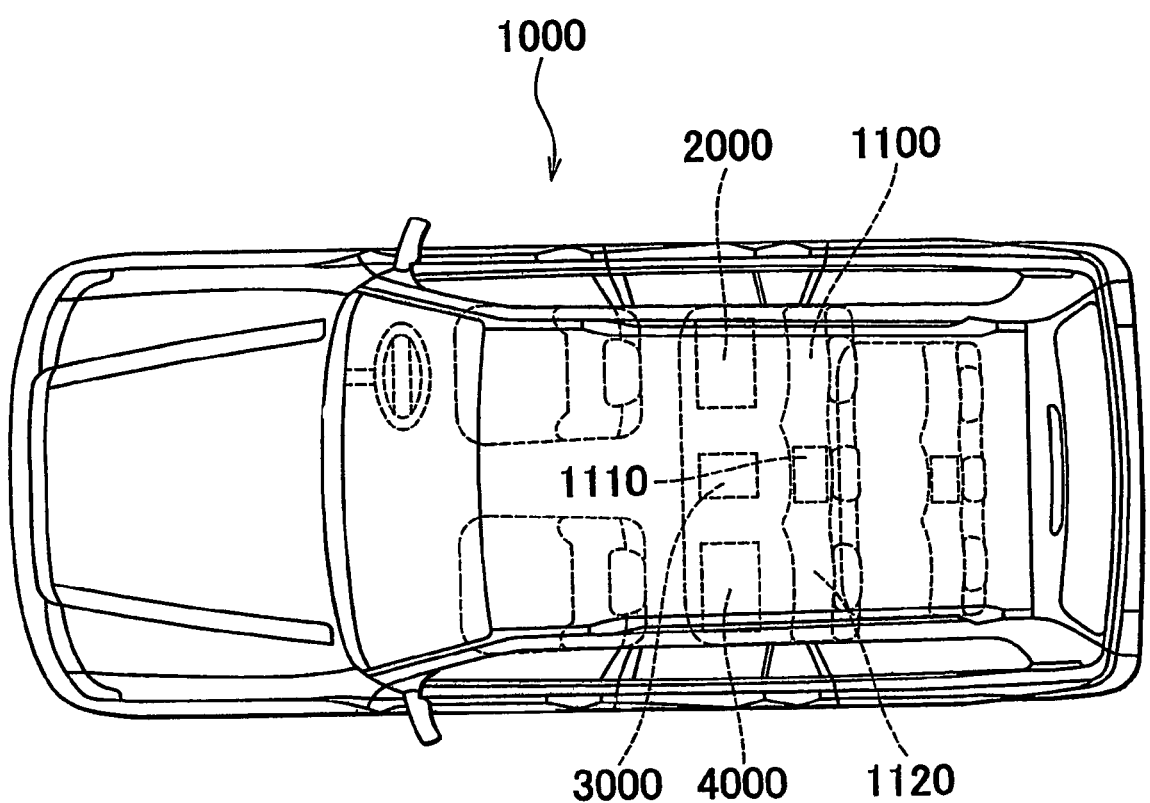
FIG. 1 is a top view of a vehicle that is mounted with a battery pack using a mounting structure in accordance with an embodiment of the invention.
Figure 2:
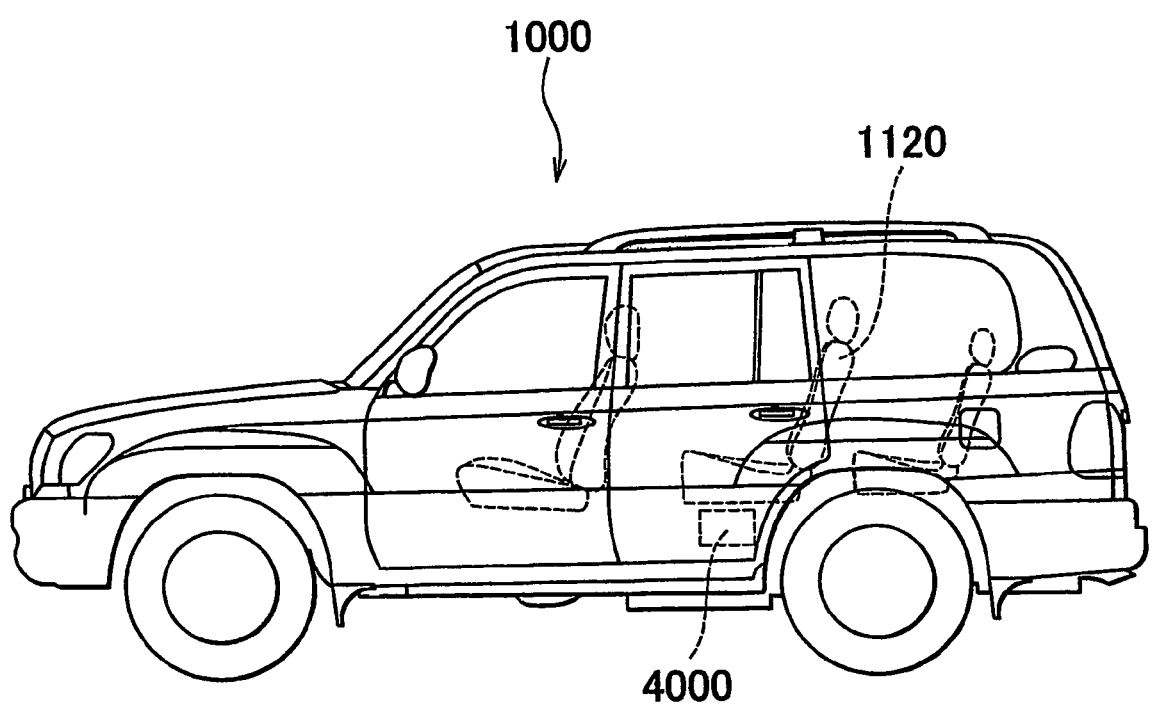
FIG. 2 is a lateral view of the vehicle that is mounted with the battery pack using the mounting structure in accordance with the embodiment of the invention.

As shown in FIGS. 1 and 2, this vehicle 1000 is mounted with a right battery unit 2000 below a rear-right seat 1100. The right battery unit 2000 is part of the battery pack mounted in the vehicle 1000. A center battery unit 3000 is mounted below a rear-center seat 1110. In addition, a left battery unit 4000 is mounted below a left rear seat 1120. For example, as described above, the battery pack is constructed such that the right battery unit 2000 as a single unit is formed of 12 modules, that the center battery unit 3000 as a single unit is formed of six modules, and that the left battery unit 4000 as a single unit is formed of 12 modules.

As shown in FIGS. 1 and 2, the battery pack (which is divided into the right battery unit 2000, the center battery unit 3000, and the left battery unit 4000) that is mounted according to the mounting structure in accordance with the present embodiment is mounted below the rear seats 1100, 1110, and 1120. The rear seats 1100, 1110, and 1120 have a fold-down function. That is, if the rear seats 1100, 1110, and 1120 have their seat backs tilted down in a forward direction, they are as high as a floor face of a luggage room. The fold-down function will be described with reference to FIGS. 3A and 3B.

Figure 3A:
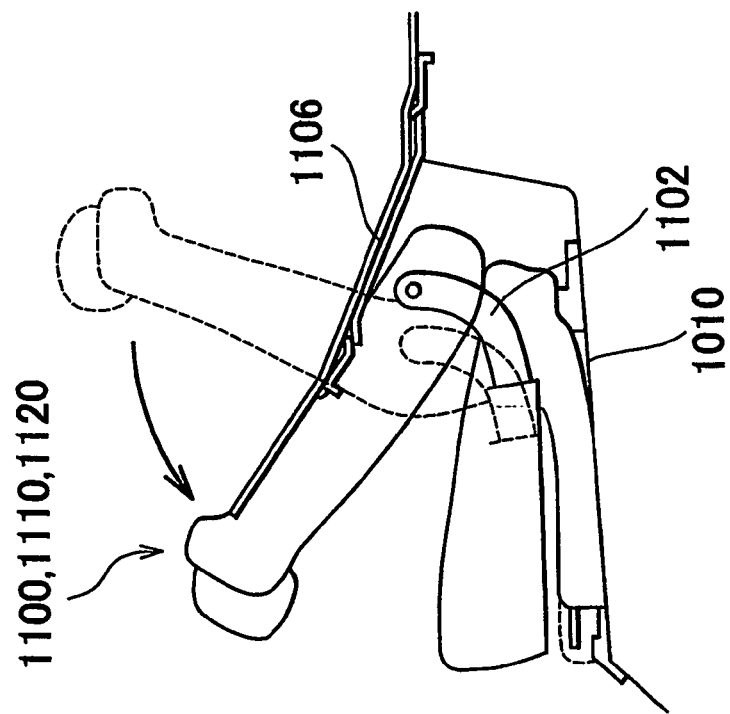
FIGS. 3A and 3B are an illustrative view of a fold-down function of a seat.
Figure 3B:
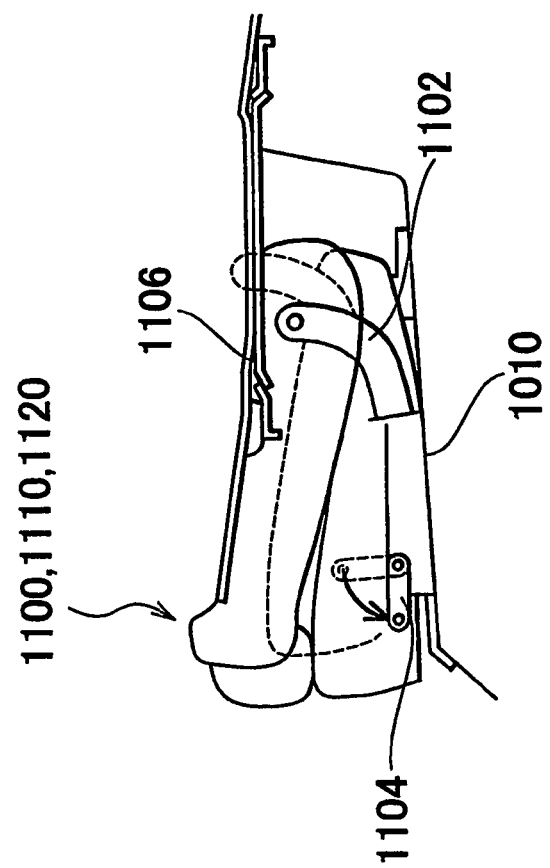

As shown in FIGS. 3A and 3B, the seat back of each of the rear-right seat 1100, the rear-center seat 1110, and the rear-left seat 1120 is unlocked by releasing a seat-fold stopper belt 1106. The seat back is thereby tilted down in a forward direction. At this moment, a link 1104 is tilted down forwards approximately by 90°, whereby a seating face and the seat back of each of the seats sink downwards. This is referred to as the fold-down function. The fold-down function as mentioned herein serves to equalize the height of a back face of the seat back with the height of the floor face of the luggage room, so that the floor face of the luggage room is flattened.

Figure 4:
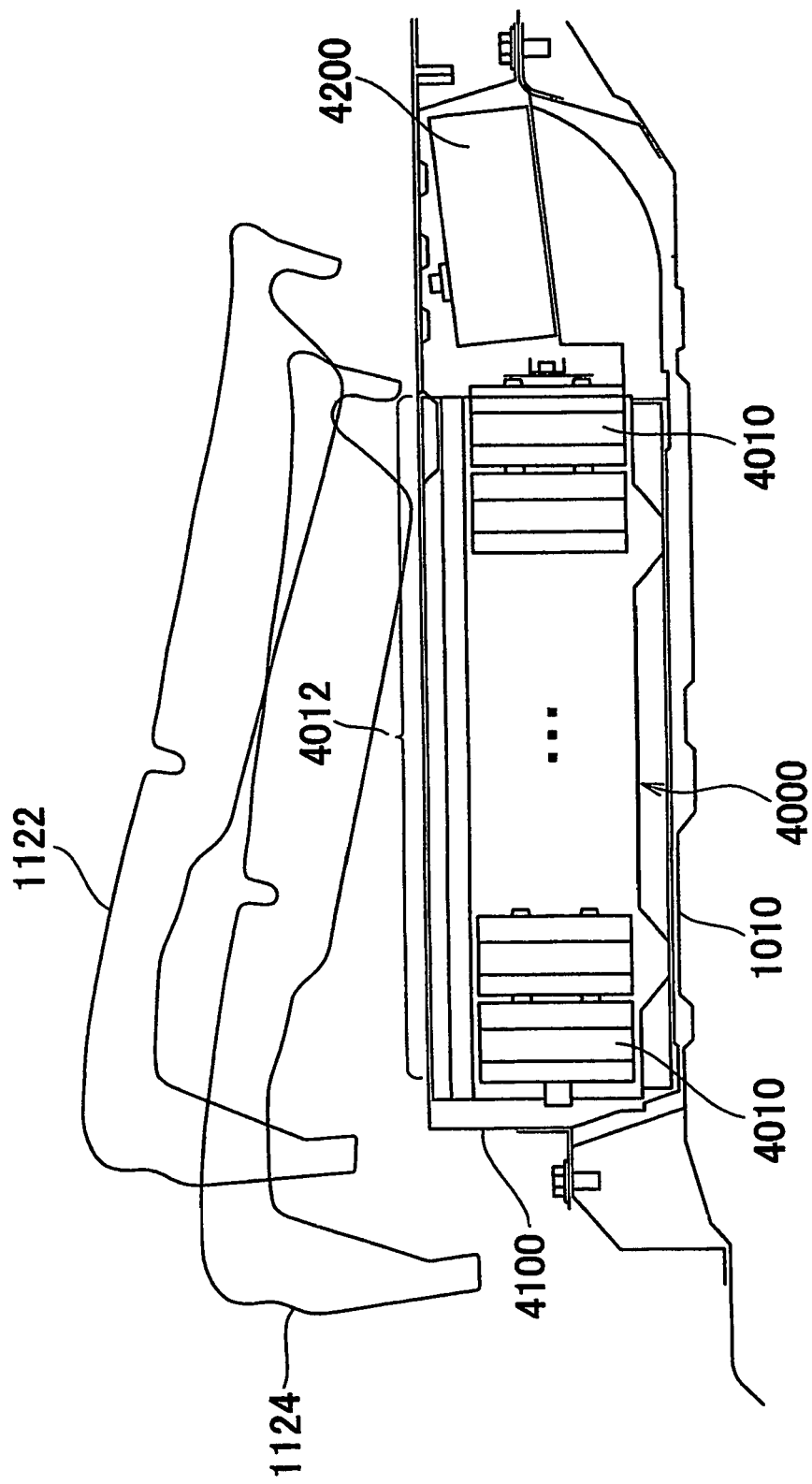
FIG. 4 is a detailed lateral view of the vehicle that is mounted with the battery pack using the mounting structure in accordance with the embodiment of the invention.

FIG. 4 is a lateral view of the vehicle 1000 that is mounted with the battery pack using the mounting structure in accordance with the embodiment of the invention. The rear-left seat 1120 shown in FIG. 4 is viewed from the left side with respect to a forward direction of the vehicle. The rear-left seat 1120 in a normal service state is illustrated as a rear-left seat 1122, whereas the rear-left seat 1120 in a fold-down service state is illustrated as a rear-left seat 1124.

Each of battery modules 4012 is formed below the rear-left seat 1120 by connecting a plurality of (e.g., six) battery cells 4010 in series. A plurality of the battery modules 4012 (e.g., 12 modules) are disposed in a direction perpendicular to the sheet of FIG. 4, whereby the left battery unit 4000 is constituted.

The left battery unit 4000 is provided on a floor panel 1010, and is covered with a battery protection cover 4100 so as to be protected from the impact of an external object or the penetration of water contents. A cooling fan 4200 for cooling the left battery unit 4000 is installed.

Figure 5:
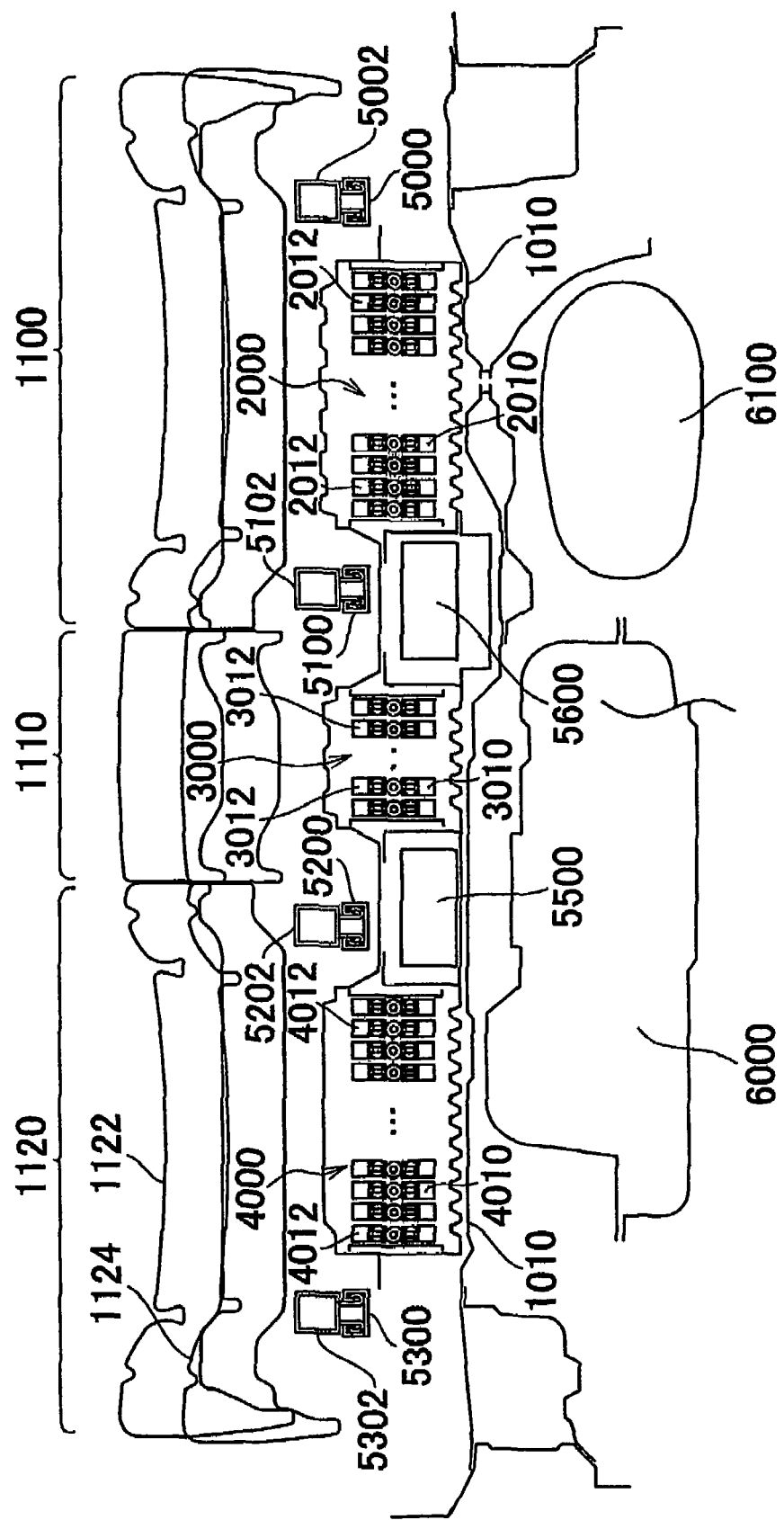
FIG. 5 is a rear view of the vehicle that is mounted with the battery pack using the mounting structure in accordance with the embodiment of the invention.
Figure 6:
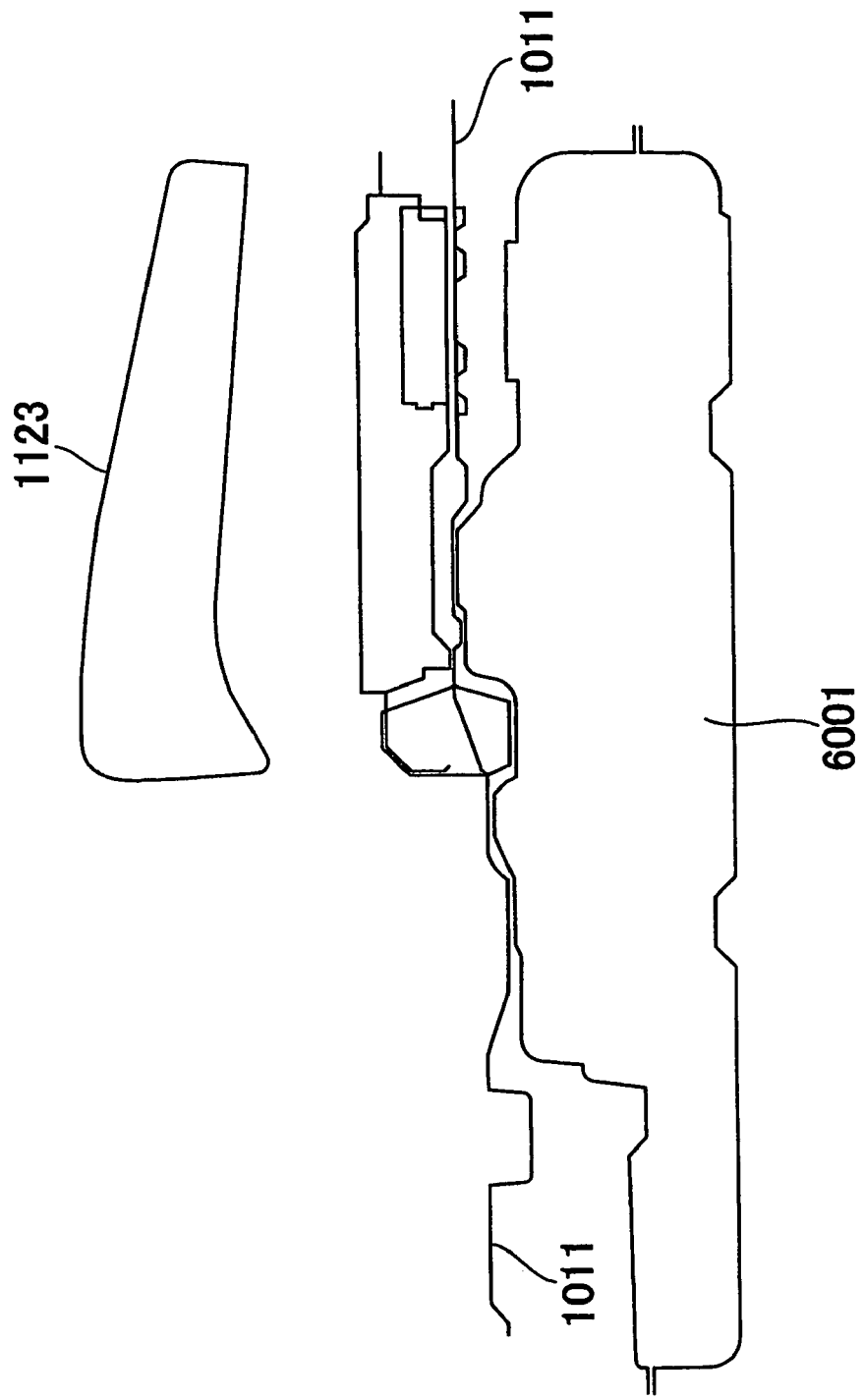
FIG. 6 is a detailed lateral view of a vehicle that is mounted with a battery pack using a mounting structure in accordance with a related art of the invention.

FIG. 5 is a rear view of the vehicle 1000 that is mounted with the battery pack using the battery-pack mounting structure in accordance with the embodiment of the invention.

As shown in FIG. 5, the right battery unit 2000, the center battery unit 3000, and the left battery unit 4000 are disposed below the rear-right seat 1100, the rear-center seat 1110, and the rear-left seat 1120 respectively. For instance, the left battery unit 4000 is installed between slide rails 5200 and 5300 for sliding the rear-left seat 1120 in a longitudinal direction of the vehicle.

It is assumed herein that the rear-right seat 1100 and the rear-center seat 1110 shown in FIG. 5 slide together in the longitudinal direction. By the same token, the right battery unit 2000 is installed between a seat rail 5000 and a seat rail 5100, while the center battery unit 3000 is installed between the seat rail 5100 and a seat rail 5200.

The rear-right seat 1100 is fixed by a seat fixture jig 5002 and a seat fixture jig 5102, which are slidably provided on the seat rail 5000 and the seat rail 5100 respectively. Hence, the seat fixture jig 5002 and the seat fixture jig 5102 are provided in such a manner as to be slidable with respect to the seat rail 5000 and the seat rail 5100 respectively. The rear-right seat 1100 can thereby be slid in the longitudinal direction of the vehicle. At this moment, the rear-center seat 1110 also slides in the longitudinal direction, together with the rear-right seat 1100.

The right battery unit 2000 is composed of a plurality of battery modules 2012 (e.g., 12 modules) that are arranged in a lateral direction of the vehicle 1000. Each of the battery modules 2012 is composed of a plurality of battery cells 2010 (e.g., six cells) that are connected in series. These battery modules 2012 are connected to one another in series.

The center battery unit 3000 is composed of a plurality of battery modules 3012 (e.g., six modules) that are arranged in the lateral direction of the vehicle 1000. Each of the battery modules 3012 is composed of a plurality of battery cells 3010 (e.g., six cells) that are connected in series. These battery modules 3012 are connected to one another in series.

The left battery unit 4000 is composed of a plurality of battery modules 4012 (e.g., 12 modules) that are arranged in the lateral direction of the vehicle 1000. Each of the battery modules 4012 is composed of a plurality of battery cells 4010 (e.g., six cells) that are connected in series. These battery modules 4012 are connected to one another in series.

The right battery unit 2000, the center battery unit 3000, and the left battery unit 4000 are connected in series. Thus, the 30 modules are connected in series in the battery unit as a whole. Because the six cells are connected in series in each of the modules, the 180 cells are connected in series in the battery unit as a whole. If it is assumed that each of the cells outputs a voltage of 1.2V, the battery pack has a rated voltage of 216V.

A system main relay and a current sensor 5600 are disposed below the seat rail 5100 and above the floor panel 1010 between the right battery unit 2000 and the center battery unit 3000. An ECU (electronic control unit) 5500 is installed below the seat rail 5200 and above the floor panel 1010 between the center battery unit 3000 and the left battery unit 4000.

A fuel tank 6000 and a muffler 6100 are disposed below the floor panel 1010.

As shown in FIGS. 4 and 5, the battery pack mounting structure in accordance with the embodiment is obtained by substantially flattening the upper convex shape of the floor panel 1011 of the vehicle in accordance with the related art. That is, the floor panel 1010 is smaller in height above ground level than the floor panel 1011 in accordance with the related art by a value corresponding to a top convex portion of the floor panel 1011. It has thus become possible to widen gaps between the floor panel 1010 and the seats 1100, 1110, and 1120.

The floor panel 1010 is thus flattened. The seat rails 5000, 5100, and 5200 and a seat rail 5300 have been displaced upwards insofar as the fold-down function can be realized.

Since the gaps between the floor panel 1010 and the seats 1100, 1110, and 1120 have thus been widened, the battery pack can be mounted in those gaps. Also, since gaps between the floor panel 1010 and the seat rails 5000, 5100, 5200, and 5300 have been widened, a control apparatus and the like can be disposed in those gaps. Even in the case where the battery pack, the control apparatus, and the like are thus mounted, the slide mechanism and the fold-down function of the seats can be realized.

As described above, according to the battery mounting structure in accordance with the embodiment, a battery pack composed of a plurality of battery cells or battery modules that are constructed according to the performance of a vehicle is divided into three battery units. The three units are respectively disposed at three positions formed by four seat rails that are provided to longitudinally slide right and left rear seats independently of each other. Each of the three positions is located between two corresponding ones of the four seat rails. Thus, the slide function of longitudinally adjusting positions of the seats is realized. Also, the fold-down function is achieved while the seat rails are raised in position with a flattened floor panel. As a result, even in the case where the number of the battery cells or battery modules constituting the battery pack to be mounted is large, batteries can be mounted between the floor panel and the seats while various functions of the seats are realized.

While the invention has been described with reference to the exemplary embodiment thereof, it is to be understood that the invention is not limited to the exemplary embodiment or construction. To the contrary, the invention is intended to cover various modifications and equivalent arrangements. In addition, while the various elements of the exemplary embodiment are shown in various combinations and configurations, which are exemplary, other combinations and configurations, including more, less or only a single element, are also within the spirit and scope of the invention.

The invention claimed is:

1. A mounting structure for mounting electrical equipment in a vehicle, comprising:
    a floor panel;
    first and second seats disposed on the floor panel;
    first and second pairs of seat rails being provided on the floor panel adapted to adjust a position of the seats in a longitudinal direction of the vehicle;
    a battery pack includes a plurality of cells or modules according to a performance of the vehicle, that is constructed by being divided into a plurality of battery units each of which includes one or more of the cells or the modules, a first battery unit being mounted between the first pair of seat rails, a second battery unit being mounted between the second pair of seat rails, and a third battery unit being disposed between inner rails of the first and second pairs of seat rails; and
    a control apparatus for controlling the battery pack, the control apparatus comprised of:
        an electronic control unit being disposed between the first battery unit and the third battery unit, and at least partially underneath the inner rail of the first pair of seat rails, and
        a system main relay being disposed between the second battery unit and the third battery unit, and at least partially underneath the inner seat rail of the second pair of seat rails.

2. The mounting structure according to claim 1, wherein one of the seats is a rear seat.

3. The mounting structure according to claim 2, wherein the rear seat is a second-row seat.

4. The mounting structure according to claim 1, wherein one of the seats is a front seat.

5. The mounting structure according to claim 1, wherein one of the seats has a vertically adjustable seating face.

6. The mounting structure according to claim 5, wherein the seat has a fold-down function.

7. The mounting structure according to claim 1, wherein the control apparatus further comprises a current sensor.

8. The mounting structure according to claim 1,
    wherein the first and second seats are rear seats,
    wherein the battery pack and the control apparatus are located within a cabin of the vehicle, and the electronic control unit and the system main relay of the control apparatus are both smaller in height than the battery pack, and
    wherein the first, second, and third battery units are connected in series so that the battery pack as a whole has a rated voltage of at least about 216 V.

9. A mounting structure for mounting electrical equipment in a vehicle, comprising:
    a floor panel;
    first and second seats disposed on the floor panel;
    first and second pairs of seat rails being provided on the floor panel adapted to adjust a position of the seats in a longitudinal direction of the vehicle;
    a fuel cell assembly including a plurality of cells or modules according to a performance of the vehicle, the fuel cells or modules being divided into a plurality of fuel cell units each of which includes one or more of the cells or the modules, one of the plurality of fuel cell units being disposed between the first pair of seat rails, a second of the fuel cell units being disposed between the second pair of seat rails, and a third of the fuel cell units being disposed between inner rails of the first and second pairs of seat rails; and
    a control apparatus for controlling the fuel cell assembly, the control apparatus comprised of:
        an electronic control unit being disposed between the first cell unit and the third cell unit, and at least partially underneath the inner rail of the first pair of seat rails, and
        a system main relay being disposed between the second cell unit and the third cell unit, and at least partially underneath the inner seat rail of the second pair of seat rails.

* * * * *